(12) United States Patent
Lam et al.

(10) Patent No.: US 10,788,827 B2
(45) Date of Patent: Sep. 29, 2020

(54) AIRCRAFT WING STRUCTURE AND CONTROL SYSTEM

(71) Applicant: LAM AVIATION, INC., Los Altos Hills, CA (US)

(72) Inventors: Michael Lam, Los Altos Hills, CA (US); Greg Cole, Bend, OR (US)

(73) Assignee: Lam Aviation, Inc., Los Altos Hills, CA (US)

( * ) Notice: Subject to any disclaimer, the term of this patent is extended or adjusted under 35 U.S.C. 154(b) by 316 days.

(21) Appl. No.: 15/816,839

(22) Filed: Nov. 17, 2017

(65) Prior Publication Data

US 2018/0088575 A1 Mar. 29, 2018

Related U.S. Application Data

(63) Continuation of application No. 14/907,067, filed as application No. PCT/US2014/048280 on Jul. 25, 2014, now Pat. No. 9,846,432.

(60) Provisional application No. 61/858,403, filed on Jul. 25, 2013.

(51) Int. Cl.
| | |
|---|---|
| *G05D 1/00* | (2006.01) |
| *B64C 9/04* | (2006.01) |
| *B64C 13/38* | (2006.01) |
| *B64C 9/20* | (2006.01) |
| *G05D 1/08* | (2006.01) |
| *B64C 9/00* | (2006.01) |

(52) U.S. Cl.
CPC ............. *G05D 1/0083* (2013.01); *B64C 9/04* (2013.01); *B64C 9/20* (2013.01); *B64C 13/38* (2013.01); *G05D 1/0816* (2013.01); *B64C 2009/005* (2013.01); *Y02T 50/32* (2013.01)

(58) Field of Classification Search
None
See application file for complete search history.

(56) References Cited

U.S. PATENT DOCUMENTS

| 6,079,672 A * | 6/2000 | Lam ..................... B64C 9/00 244/216 |
| 6,554,229 B1 * | 4/2003 | Lam ..................... B64C 9/00 244/217 |
| 8,340,841 B2 * | 12/2012 | Chiesa ................ G05D 1/0825 701/4 |
| 8,876,044 B2 * | 11/2014 | Cazals .................. B64C 23/076 244/87 |
| 8,939,394 B1 * | 1/2015 | Sonneborn ............. B64C 27/26 244/17.11 |
| 9,004,411 B2 * | 4/2015 | Lam .................... B64C 13/0425 244/221 |
| 9,038,964 B2 * | 5/2015 | Wildman ................. B64C 9/20 244/215 |
| 9,090,346 B2 * | 7/2015 | Kimura .................. B62D 35/00 |

(Continued)

*Primary Examiner* — Bhavesh V Amin
(74) *Attorney, Agent, or Firm* — Quarles & Brady LLP

(57) ABSTRACT

An aircraft includes a wing. The wing includes an aileron pivotally connected to a trailing edge of the wing, and a Lam aileron pivotally connected to the trailing edge of the wing. The aircraft includes a motor connected to the Lam aileron and configured to rotate the Lam aileron. The aircraft includes a controller configured to detect a deflection of the aileron from a neutral position, calculate a target deflection for the Lam aileron using the deflection of the aileron, and cause the motor to rotate the Lam aileron to the target deflection.

20 Claims, 6 Drawing Sheets

(56) References Cited

U.S. PATENT DOCUMENTS

| | | | | |
|---|---|---|---|---|
| 9,108,723 B2 * | 8/2015 | Lam | ................ | B64C 9/02 |
| 9,815,547 B2 * | 11/2017 | Saliveros | ................ | B64C 3/50 |
| 9,846,432 B2 * | 12/2017 | Lam | ................ | B64C 9/04 |
| 2010/0185345 A1 * | 7/2010 | Chiesa | ................ | G01P 13/025 |
| | | | | 701/4 |
| 2018/0088575 A1 * | 3/2018 | Lam | ................ | B64C 9/04 |

* cited by examiner

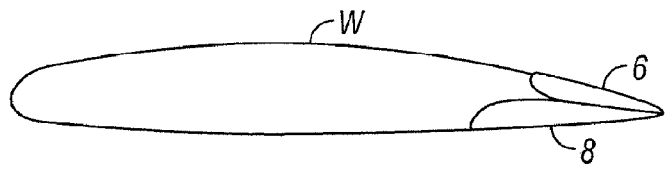
FIG. 4A
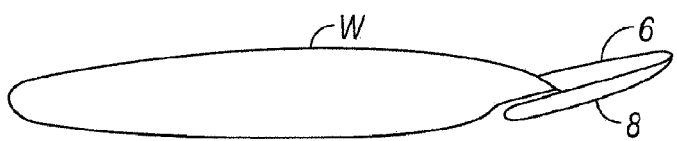
FIG. 4B
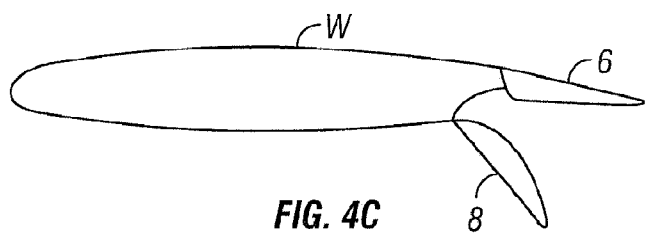
FIG. 4C
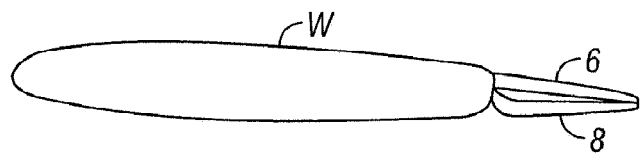
FIG. 4D
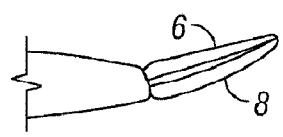     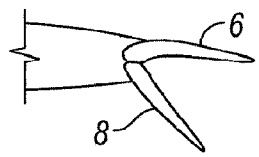     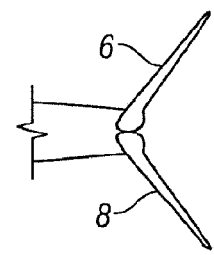
FIG. 4E           FIG. 4F           FIG. 4G

AIRCRAFT WING STRUCTURE AND CONTROL SYSTEM

CROSS-REFERENCE TO RELATED APPLICATIONS

This application is a continuation of U.S. National Stage application Ser. No. 14/907,067, entitled "AIRCRAFT WING STRUCTURE AND CONTROL SYSTEM," filed on Jan. 22, 2016, which claims priority to PCT International Application No. PCT/US2014/048280, entitled "AIRCRAFT WING STRUCTURE AND CONTROL SYSTEM," filed on Jul. 25, 2014 and claims priority to U.S. Provisional Patent Application Ser. No. 61/858,403, entitled "AIRCRAFT WING STRUCTURE AND CONTROL SYSTEM," filed Jul. 25, 2013, the entire disclosures of which are incorporated herein by reference.

FIELD OF THE INVENTION

The present disclosure relates to aircraft wing design and more specifically to a method and apparatus for improving aircraft efficiency and limiting adverse yaw.

BACKGROUND OF THE INVENTION

Immediately obvious with the invention of the airplane was the importance of controlling movement in flight, as an uncontrollable airborne airplane will soon crash. Aviators soon settled on ailerons for roll control. An aileron is a hinged panel on the trailing edge of the wing, usually located at the outboard portion of the wing, which, when deflected downwardly, increases the lift of that wing, to roll or bank the airplane into a turn. At the same time, the aileron on the other wing is deflected upwardly, to decrease the lift on that wing and thus augment the rolling motion. The ailerons on the opposing wings of an airplane are typically mechanically coupled to one another. The configuration and application of the conventional aileron system has changed little, if at all, over more than nine decades since the first fixed-wing aircraft were produced.

One of the most objectionable features of conventional aileron application is a phenomenon known as "adverse yaw," and virtually all existing fixed-wing aircraft suffer disadvantageous consequences associated with adverse yaw. When a turn is initiated with conventional ailerons, the nose of the airplane turns first in a direction opposite to that of the intended turn. This is usually compensated by using rudder deflection to "coordinate" the turn. The adverse yawing motion is a direct result of aileron application. While producing more lift to bank the airplane into a turn, the downwardly-deflected aileron also produces more drag, which acts momentarily to cause the airplane's nose to turn in the direction opposite to the intended turn. That is, when one wing is lifted relative to the other wing by operation of a conventional aileron to bank the airplane into a turn, that wing is also pulled back away from the turn relative to the wing on the other side, causing the nose initially to turn, or yaw, in the direction opposite to the turn. This effect becomes increasingly detrimental as the roll rate increases and/or airspeed decreases.

Adverse yaw produced by the conventional aileron can also contribute to spin entry. Instinctive application of conventional ailerons during attempted spin recovery can aggravate the spin condition. When spinning, an airplane is descending and turning in a tight spiral flight path. The conventional aileron is not effective in spin recovery. In a left hand spin, for instance, the left wing is down and toward the center of the spiral. Instinctively, many pilots are tempted to initiate right stick or control yoke movement to roll towards the right and out of the spin. With conventional ailerons this will deploy the left aileron down and the right aileron up. The left aileron may create more drag than the form drag caused by the up-going right aileron and the spin may be further aggravated. For an airplane equipped with conventional ailerons, application of rudder alone is used for spin recovery. Much of spin training involves conditioning pilots to avoid the instinctive attempt to roll out of the spin. Nonetheless, many pilots have aggravated spins by attempting such recoveries with conventional ailerons.

Various methods and devices have been used to counter adverse yaw. Among them are the differential aileron with its finite deflection ratio, and the spoiler. The differential variation of conventional ailerons is the most commonly used solution and provides some marginal improvement, but has limitations. For instance, conventional ailerons use a fixed-ratio linkage mechanism and are coupled to each other. This limits their ability to precisely counteract adverse yaw because the major causes of adverse yaw vary with lift.

Use of spoilers may obviate adverse yaw, but spoilers present their own problems. Spoilers are so named because they spoil or effectively eliminate lift. Ailerons deliver continuously variable changes in lift within their operational envelopes, whereas spoilers operate in a stepwise manner, being functionally either on or off, and thus are difficult to modulate between full and zero effect. Roll control is difficult to achieve with spoilers without complicated subsystems or augmenting devices.

Therefore, there is a need for an improved airplane wing design that allows a pilot the ability to better counteract adverse yaw. Further, there is a need for an improved wing design that uses ailerons that can be controlled automatically. Further, there is also a need for an aileron system where the ailerons are not mechanically coupled to one another.

BRIEF DESCRIPTION OF THE DRAWINGS

FIGS. 4A-4G are cross sectional views of a wing depicting a number of different configurations of the Lam aileron panel and flap panel of the present disclosure.

DETAILED DESCRIPTION OF THE PREFERRED EMBODIMENTS

Figure 1:
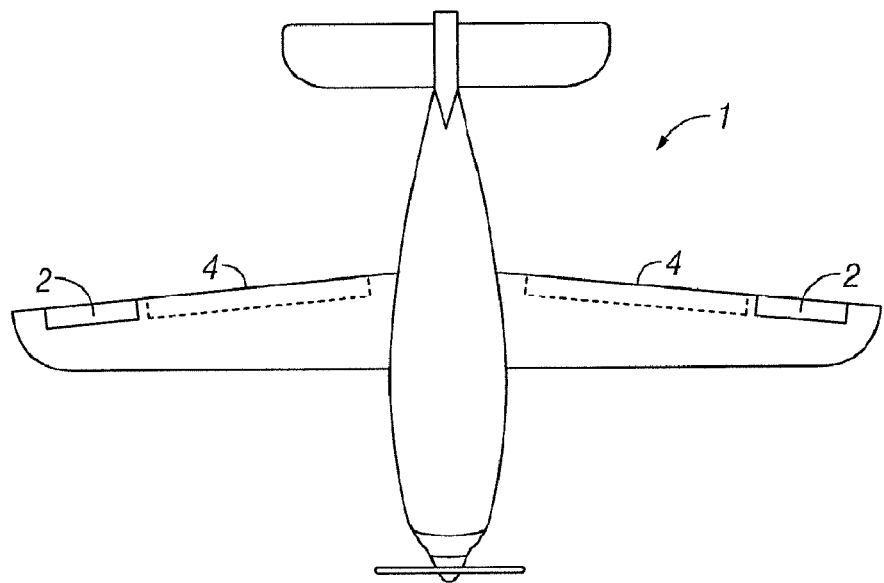
FIG. 1 shows a top view of an airplane with a conventional aileron and flap system known in the prior art.

The present invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth.

The present disclosure provides an improved wing design incorporating a flight control system having additional aileron panel structures (referred to herein as Lam ailerons) that are utilized to improve aircraft flight performance and efficiency and reduce the deficiencies associated with conventional aileron flight control structures. The control system mitigates the problems described above, including adverse yaw, while offering desirable features not possessed by conventional ailerons, including improved spin recovery. The control system also increases the efficiency of the aircraft and, as such, wing designs that do not require some additional lift-creating surfaces (such as leading edge lift surfaces or slats) can be utilized.

In the present system, the Lam aileron panels can be precisely positioned, independently of one another, via a motor such as a servo motor. In positioning the Lam ailerons, the position of conventional ailerons of the aircraft or of one or more control inputs to the aircraft can be detected, and that detected position or input can be used to set the Lam aileron panels to a position to control aircraft flight. The present control system incorporates inherently a safety backup option which allows a pilot to control at least a subset of the aircraft's flight control surfaces manually in the event motors or other control devices for the novel control surfaces (i.e., Lam ailerons) were to fail. The control system is relatively simple and can installed onto existing airplane wings. In other embodiments, the control system can be incorporated into new wing designs.

The Lam aileron panels of the present disclosure can be similar in shape and external appearance to a conventional aileron, but the construction of the Lam aileron panels and their deployment are different. In contrast to existing ailerons, the Lam ailerons, in one particular implementation, may be configured to move independently of one another when deflecting upwards. As such, during many maneuvers, only a single Lam aileron may be deflected away from its resting or neutral position, while the Lam aileron on the other wing remains in its resting or neutral position.

The Lam aileron panels are generally comprised of at least one moveable panel located at the rear portion of the wing, in a spanwise direction and aligned with the wing's trailing edge. In some implementations, the Lam aileron can be located on the wing directly over a conventional flap. In some cases, the flap may be modified so that the flap is configured to move downwards and/or extend away from the wing to provide a conventional flap function, while also being able to rotate upwards in the same manner as the Lam aileron, as described below. In that case the Lam aileron and the flap may be formed as a single controllable panel.

The Lam aileron may be independently hinged at its leading edge or may be hinged on a common axis with the lower flap panel and rotate to make angular deflections with respect to the wing. In one implementation, the Lam aileron is combined with a lower flap panel such that the Lam aileron can be deflected upwardly only from the neutral position, while the lower, auxiliary flap is capable of both upward and downward deflections from its neutral position. In that case, the upper Lam aileron panel is deployed independently as an aileron and the lower panel is deployed independently as an auxiliary flap. Both panels can be deployed together upwardly as an aileron.

As with other ailerons, deflection results effectively in a change of the airfoil's camber and thus a change in the lift coefficient, CL for the corresponding wing. In the case of the present disclosure, the upward deflection of the Lam aileron results in a negative change in CL. The wing deploying the Lam aileron then produces less lift than the other wing with its Lam aileron being maintained in a neutral position. Thus, the wing on which the Lam aileron is being deployed drops and the aircraft is rolled toward the lowered wing into a turn. The upwardly-deflected Lam aileron protrudes into the stream of air flowing over the wing, creating form drag, to rotate the nose of the aircraft toward the turn. Unlike activation of conventional ailerons (which produce the opposite effect), this action produces favorable yaw.

The present flight control system's functional property of favorable yaw aids in both spin avoidance and spin recovery. For an airplane using the present control system, the same stick movement used by a pilot to roll right and out of the left hand spin described above, results in only the right Lam aileron going up and on the outside of the spiral. The outward yawing motion plus the outside wing being depressed will roll the airplane away from the spiral center and aid in recovering from the spin. This will augment the opposite rudder input usually used for spin recovery. The form drag associated with the present control system also aids in spin recovery. Depending on the installation, this effect may be accentuated by the simultaneous deployment of one or more auxiliary flap panels with the Lam aileron panel, creating a drag rudder on one wing or both wings.

FIG. 1 shows a top view of an airplane known in the prior art. In the prior art, a conventional airplane 1 has a pair of wings, each with an aileron panel 2 located adjacent to a flap 4. As described above, aileron panels 2 on each wing may be deflected either upwardly or downwardly and, as such, cannot be positioned over flaps 4. When the aileron panel 2 on one wing is deflected upward, the aileron panel 2 on the opposite wing is deflected in the opposite direction. This opposite motion of aileron panels 2 provides roll control for the aircraft. Aileron panels 2 are mechanically linked so that any motion of one aileron panel 2 always results in the opposing motion of the other aileron panel 2.

As noted above, however, this opposing motion of aileron panels 2 results in inefficient and/or dangerous aircraft response including adverse yaw and spin aggravation. Additionally, because each of aileron panels 2 can move downwardly, flap panels 4 of aircraft 1 cannot be positioned directly underneath aileron panels 2. As such, the length of the wing must be increased to accommodate both the aileron panels 2 and flap structures 4. This increased wing size reduces the efficiency of the wing and of aircraft 1.

Figure 2:
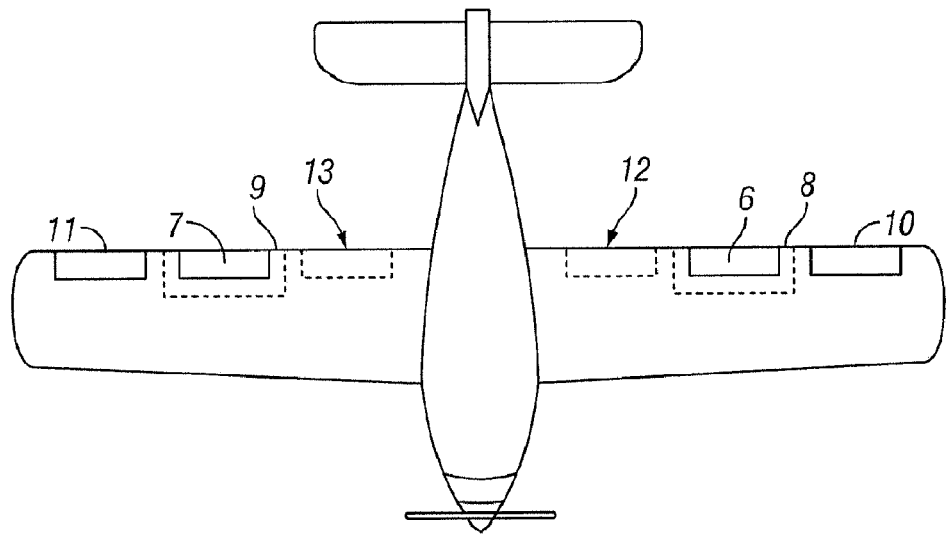
FIG. 2 shows a top view of an airplane with an embodiment of the aileron system of the present invention.

FIG. 2 shows a top view of an aircraft including the present flight control system. The aircraft depicted in FIG. 2 includes conventional aileron panels 10 and 11, as well as flaps 8 and 9 positioned in board from the aileron panels 10 and 11. In FIG. 2, Lam aileron panels 6 and 7 are added to each wing inboard from aileron panels 10 and 11 and, optionally, positioned over flaps 8 and 9. In some implementations, additional Fowler flaps 12 and 13 may be inboard from flaps 8 and 9.

In one implementation of the present wing, flaps 12 and 13 are implemented as Fowler flaps that extend from the inboard portions of the wing out to approximately 63% of the wing's span. The inboard Fowler flaps 12 and 13 are designed to provide maximum lift performance. Then, Lam aileron panels 6 and 7 extend from 63% of the wing span to approximately 78% of the span. Depending upon the wing configuration, additional flap panels 8 and 9 can be located underneath Lam aileron panels 6 and 7, as described below.

The Lam aileron panels 6 and 7 are particularly effective during high CL conditions (e.g., as when flaps 12 and 13 are deployed) as the Lam aileron panels 6 and 7 operate as lateral control devices with an incremental CL change with control surface displacement. In contrast, conventional ailerons operate by effectively changing the angle of attack of the local wing section. This change is constrained by lift coefficient limits and by the 3D wing local upwash field. This effectively causes conventional ailerons to work less well as the wing CL increases. In contrast, the Lam ailerons 6 and 7 work more effectively as the wing CL increases, such as when flaps (e.g., flaps 12 and 13) are deployed.

The wing may then include conventional aileron panels 10 and 11 that extend from 78% of the span to approximately 97% span. These conventional aileron panels 10 and 11 generally work best at high speeds and allow for precise control around zero deflection and with small deflections. The conventional aileron panels 10 and 11 provide a conventional, informative, feel through the control mechanism for the pilot and can be minimally sized for the control necessary for controlled flight in the event of a Lam aileron 6 and/or 7 failure. The conventional ailerons also work well when equipped with conventional trim tabs for lateral trim adjustments.

In the design shown in FIG. 2, the pilot is provided with a conventional flight control input (e.g., flight control rudder, yoke, or control column) that enables the pilot to directly control the position of aileron panels 10 and 11. This control may be provided using conventional mechanical and/or electrical linkages that allow the pilot to set the position of each aileron panel 10 and 11. That control input causes aileron panels 10 and 11 to change position, thereby enabling some movement of the aircraft. However, as the position of aileron panels 10 and 11 are modified, the position of the panels 10 and 11 is monitored. The position of aileron panels 10 and 11 (or the corresponding pilot input) is then used to control and set the position of Lam aileron panels 6 and 7. As such, the movement of Lam aileron panels 6 and 7 complements that of conventional aileron panels 10 and 11. This enables the aircraft to be flown by a pilot using familiar control surfaces (i.e., conventional aileron panels 10 and 11), but with the additional activation of Lam ailerons panels 6 and 7, the improved flight characteristics described above can be observed.

For example, if the pilot wishes to roll the aircraft to the right (causing the right wing to move downwards), the pilot provides the suitable control input using the aircraft's control column. This control input, which is connected to conventional aileron panels 10 and 11 causes the conventional aileron panel 11 on the right wing to move upwards, while the input causes the conventional aileron panel 10 on the left wing to move downwards. As the pilot provides this control input, the input has a familiar feel and feedback due to conventional linkages between the control input and conventional aileron panels 10 and 11.

As the conventional aileron panels 10 and 11 move in response to the pilot's input, however, the control input setting the position of the aileron panels 10 and 11 is detected (or the position of the aileron panels 10 and 11 may be directly detected). That detected control input or aileron panel 10 and 11 position can then be used to position Lam aileron panels 6 and 7 in a manner that is complementary to the position of aileron panels 10 and 11.

In this example, with the aircraft's right wing being rolled downwards, the right aileron panel 11 is deflected upwardly, while the left aileron panel 10 is deflected downwardly. In response to the aileron panel 10 and 11 position, the Lam aileron panel 7 on the right wing is deflected upwardly, while the Lam aileron panel 6 on the left wing is retained in its neutral, or non-raised, position. In this manner, the right Lam aileron panel 7 contributes to the reduction in lift of the right wing, while minimizing or reducing the adverse yaw problems created by the conventional aileron panels 10 and 11.

With the opposite control input (causing the right wing to move downwards), the opposite Lam aileron panel 6 and 7 behavior would be observed.

The present wing configuration, therefore, combines the benefits of the well-tested conventional aileron panel control system with the benefits of the Lam aileron panel, as described above. By providing an aircraft control system that combines the Lam aileron panel with a conventional aileron panel, a pilot can control an aircraft using a familiar control surface —namely the conventional aileron panel— and as such, the pilot will receive familiar feedback through the control column. Then, based upon the pilot's actions, the Lam aileron panels are deployed (for example, by a microprocessor in combination with a servo, as described below) to provide the additional benefits of the Lam aileron panel. Additionally, the utilization of Lam aileron panels as described herein mitigates the problems described above with respect to negative adverse yaw and roll characteristics associated with conventional aileron panels.

In the present wing configuration, should the systems driving the Lam aileron panels fail (e.g., due to an electrical failure or servo mechanism failure), the pilot will still be able to control the conventional aileron panels and the aircraft will still be navigable though the problems of adverse yaw and inefficiencies, as described above, will be re-introduced to the airplane.

Additionally, because the Lam aileron panel is configured to be deflected in only an upward direction, the Lam aileron panels (e.g., Lam aileron panels 6 and 7 in FIG. 2) can be installed into the wing over a complementary flap structure (see, for example, the wing arrangement depicted in FIG. 2 and flaps 8 and 9). This characteristic allows for the installation of Lam aileron panels on existing wing structures that already include conventional aileron panel and flap structures (such as the wing structure of FIG. 1). As such, the present Lam aileron panels may be installed as a retrofit into existing wing structures.

Conversely, the present control system may be implemented as a retrofit to an existing airplane wing design that originally includes only flaps and Lam ailerons. In such a wing, for example, the Lam ailerons may be controlled electronically, such as in a fly-by-wire system. Alternatively, the Lam ailerons may be controlled mechanically. In either case, the Lam ailerons by themselves may not provide the same 'feel' to the pilot as conventional ailerons. In the fly-by-wire system, the Lam ailerons can be driven by a servo and so physical feedback may not be provided to the pilot. In mechanically-driven Lam ailerons, because the Lam ailerons are not connected to one another (in the same fashion as conventional ailerons) the Lam ailerons are not driven to their respective neutral positions, resulting in reduced pilot feel at a neutral control input. In such a wing, relatively small conventional ailerons may be added to the wing and connected to the pilot's control system. As such, the conventional ailerons may be utilized to provide improved pilot feel using a wing configured in accordance with the present disclosure.

Figure 3A:
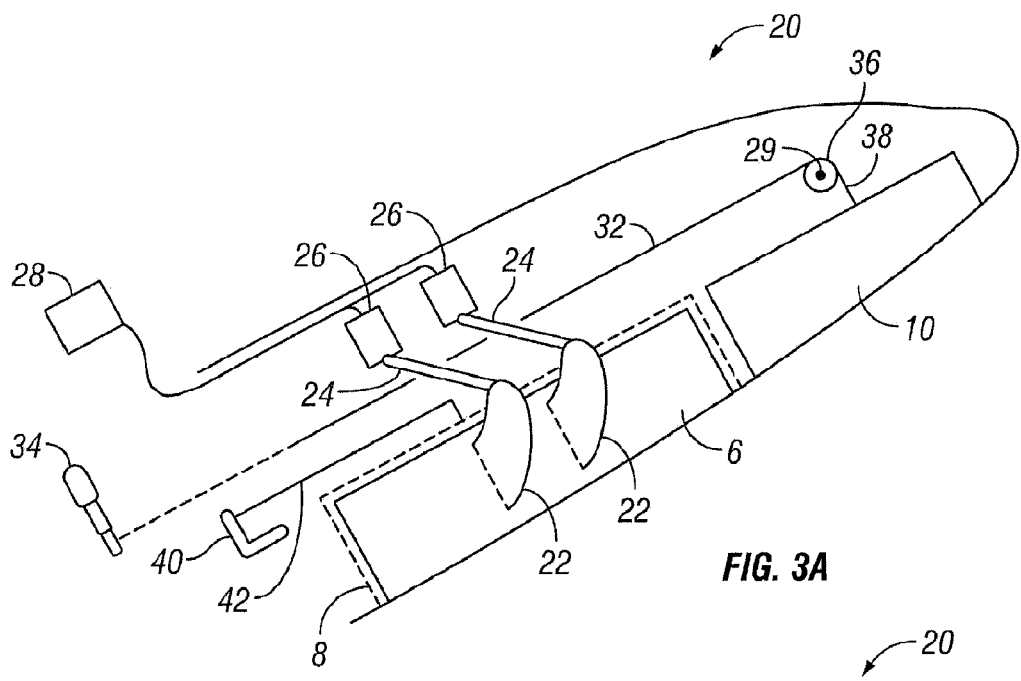
FIG. 3A shows a perspective view of an airplane wing with an embodiment of the aileron system in a closed position.
Figure 3B:
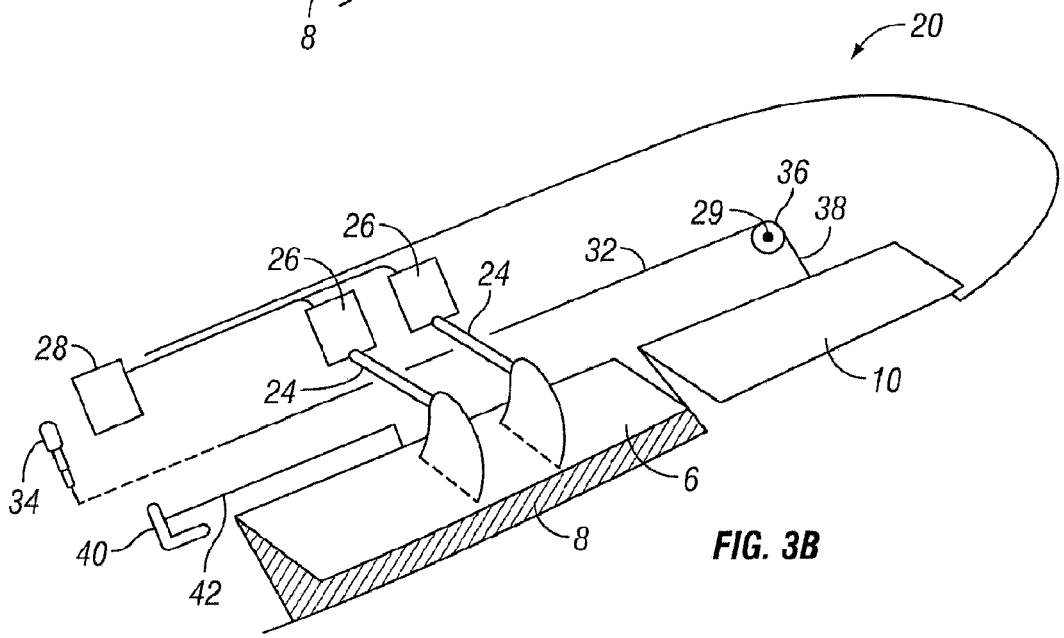
FIG. 3B shows a perspective view of an airplane wing with an embodiment of the aileron system in an open position.

FIGS. 3A and 3B shows perspective views of a right wing incorporating the improved aileron system 20 of the present invention. Portions of the wing in FIG. 3A have been rendered as transparent allowing structures internal to the wing to be depicted. While only the right wing is shown, it should be understood that the aileron system has a similar configuration for the left wing as described below for the right wing.

FIG. 3A shows a view of the Lam aileron panel 6 in a neutral or closed position and FIG. 3B shows a view of the aileron 6 in a raised or open position. The aileron system 20 is shown to include a Lam aileron panel 6 and an auxiliary flap panel 8 stowed underneath the aileron panel. In some cases, an additional Fowler flap panel may be positioned inboard from flap panel 8. Both the Lam aileron panel 6 and the auxiliary flap panel 8 are separately hinged to the wing's rear spar or other hard points, and can be operated independently, but can also be made to operate in unison for certain functions when they are engaged.

In one embodiment, the aileron panel 6 has a pair of fins 22 attached to a top surface of the Lam aileron panel 6. The fins 22 can be made of any shape; however it is understood that the fins 22 may have a generally aerodynamic profile. Further, it should be understood that while two fins are shown in this figure, any number of fins can be used so long as the number of fins is sufficient to allow rotation of the Lam aileron panel 6 about its hinge. The fins 22 are then each attached to a rod 24, which can be translated along its length as needed to allow for raising or lowering of Lam aileron panel 6. Fins 22 represent one form of structure enabling connection between rod 24 and Lam aileron panel 6. Many different types of housings having different geometry, shapes, and configurations may be utilized.

In one implementation, there are multiple rods 24 attached to multiple fins 22. The rods 24 are cylindrical and utilize an actuator or some other mechanical device which allows the rods 24 to move or translate as needed. One end of a rod 24 is attached to a motor 26 located within the wing of the airplane, while another end of the rod 24 is attached to the aileron panel 6. The rod 24 is connected to a motor 26 such as a servo motor. In turn, the servo motors are connected via a wire or cable to an electronic control unit 28 (ECU) which can control the exact positioning of the ailerons 6, 7 by actuating motor 26.

The rods 24 can be connected to both fins 22 and motor 26 at a hinged connection. As such, when the rods 24 are pulled in a direction away from fins 22, the rods 24 pull on fins 22 causing Lam aileron panel 6 to rotate about its hinge and be lifted upwards (see FIG. 3B). Conversely, when the rods 24 are pushed towards fins 22, the rods 24 push on fins 22 causing Lam aileron panel 6 to rotate about its hinge and be lowered towards its neutral position.

The ECU 28 is able to calculate a suitable position of the ailerons (e.g., in view of a number of inputs) and then cause the servo motors 26 to move the Lam ailerons 6 and 7 to that position. The ECU 28 can calculate this effective position based on a number of different factors including the position of the conventional ailerons 10 and 11, aircraft speed, dynamic pressure, density of the surrounding air, and/or other aerodynamic parameters. The position of the conventional ailerons can be detected, for example, from a sensor 29 located on or near the ailerons 10 and 11 or the mechanical linkage between the aircraft control column and ailerons 10 and 11.

The sensor 29 may include, for example, a potentiometer coupled to a hinge that rotates with pilot input coupled to the aircraft's conventional ailerons. As the hinge rotates, that rotation can be measured by the potentiometer. Based upon the measured rotation, a position of the conventional aileron panels can be determined and suitable inputs for ailerons 10 and 11 can be derived therefrom.

The sensor 29 reports the position of the conventional ailerons to the ECU 28, which then uses this information to calculate an optimal position of the ailerons 6, 7.

In one implementation, the ECU 28 determines which aileron is deflected upwards. The ECU 28 then determines that the Lam aileron on the opposite side of the upwardly-deflected aileron (i.e., the Lam aileron on the same wing as the downwardly-deflected aileron) will be maintained in a neutral position and that the Lam aileron 6 on the same wing as the upwardly-deflected aileron will also be deflected upwardly. In order to determine the degree to which the Lam aileron 6 should be deflected, the ECU 28 calculates a degree of Lam aileron 6 deflection based upon the measurement amount of aileron 10 deflection. Alternatively, rather than determine a position of aileron deflection, the ECU 28 may instead determine a desired deflection of the Lam ailerons based upon a control input (e.g., position of a control column, other pilot-based flight control input), speed of the airplane, dynamic pressure, or density of the surrounding air.

The ECU 28 can vary the amount of deflection of the Lam aileron 6 based on combinations of the factors described above. In one implementation, the ECU 28 detects that the conventional aileron on one of the aircraft's wings is deflected upwards by a particular angle. In response, the ECU 28 sets the Lam aileron on that same wing to the same upwards angle of deflection, while the other Lam aileron (on the wing on which the conventional aileron is deflected downwards) is set to its neutral position. In this implementation, the position of the Lam ailerons ECU 28 is determined in a linear fashion based upon a position of the aircraft's conventional ailerons.

In other implementations, though, the position of the Lam ailerons may be determined in view of a number of factors. For example, when the aircraft is at cruising speed, the amount of Lam aileron deflection may be minimal. This is possible because at high speed even very small deflections of the aircraft's conventional ailerons are sufficient to control the aircraft. When the aircraft is at low speed (e.g., preparing to land), however, the amount of Lam aileron deflection may be increased substantially. This enables the Lam ailerons to provide significant assistance to the conventional ailerons in controlling the aircraft at relatively low speed. As such, the ECU 28 could use a scaling factor to determine the degree to which the Lam ailerons should be moved in response to detected conventional aileron deflection or control inputs. The scaling factor could be selected so that during high speed maneuvers a deflection of the conventional ailerons causes a minimal movement of the Lam ailerons (if at all), while during low speed maneuvers, that same deflection of the conventional ailerons could result in a much larger movement of the Lam ailerons and, thereby, greater assistance in controlling the aircraft adjusted as to need.

In such an implementation, the ECU 28 may use factors such as aircraft speed, dynamic pressure, and/or density of surrounding air to determine whether the aircraft is undergoing a high or low speed maneuver. As such, the ECU 28 can be configured to determine a factor that can be applied to the detected movement of the conventional ailerons to determine the degree to which the Lam ailerons should be deflected.

By implementing a sliding scale in which during a low speed maneuver more Lam aileron deflection is utilized, a more efficient wing design may be utilized. Specifically, a wing may be constructed using the smallest conventional ailerons that, when used by themselves, allow for safe operation of the aircraft. Such small conventional ailerons result in an aircraft wing that allows for very efficient maneuvers at high speed and reduced adverse yaw, but slow maneuvering at low speed. In such an implementation, the sliding scale deployment of the Lam ailerons would result in more manageable maneuvering at low speed (where the Lam ailerons provide more assistance to the conventional ailerons in controlling the aircraft), and more efficient flying at high speed (where the Lam ailerons are minimally deployed, if at all) where the small conventional ailerons are relied upon for aircraft control. Also, in such an implementation, even in the event of failure of the Lam ailerons, the conventional ailerons would be sufficient to provide for safe control of the aircraft. The added efficiency of this arrangement may also remove the necessity of leading-edge lift creating device such as leading-edge slats or augment their effectiveness.

Accordingly, the ECU 28 is configured to retrieve information regarding a number of operating conditions of the aircraft, such as its flight speed, air dynamic pressure, and/or density of the surrounding air. Then, based on the flight speed, the ECU 28 can alter the deflection of the Lam ailerons 6, 7. In one embodiment, at low speeds, the ECU 28 will deflect the Lam ailerons 6, 7 to match the deflection of the conventional ailerons 10, 11. At higher speeds, it can be beneficial to deflect the Lam ailerons 6, 7 at a smaller degree than the conventional ailerons 10, 11 to provide for more efficient flight. Therefore, in this example, the ECU 28 will factor in an airplane's speed in calculating a position of the Lam ailerons 6, 7. The ECU 28 can also take into account other various external factors such as the air dynamic pressure or air density in determining a position of the Lam ailerons 6, 7.

Figure 6:
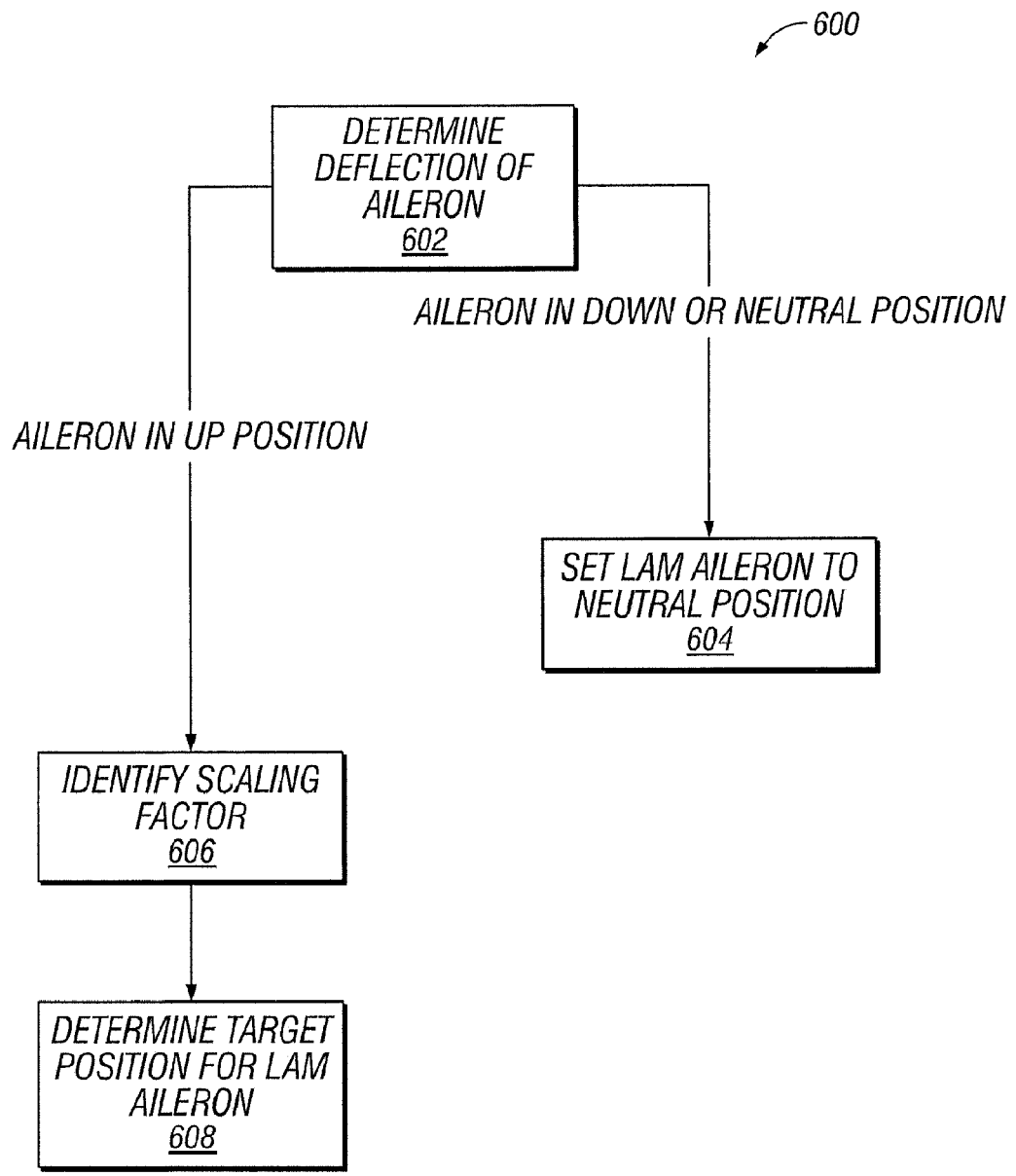
FIG. 6 is a flowchart illustrating a method for configuring Lam ailerons of an aircraft in accordance with the present disclosure.

In one embodiment, the ECU 28 is configured to set the position of each of Lam ailerons 6, 7, according to method 600 illustrated in FIG. 6. Method 600 may be performed by ECU 28 separately for each Lam aileron on the aircraft. Accordingly, method 600 may be performed once for Lam aileron 6 and performed a separate time for Lam aileron 7.

Referring to FIG. 6, in step 602 for a particular Lam aileron, the deflection of the aileron on the same wing as the Lam aileron is determined. The deflection may be measured using any suitable for determine the position of the aileron. For example, a sensor, such as a potentiometer, may be utilized to measure an amount of rotation of the aileron about its pivot connection to the wing. In that case, the amount of deflection may be measured as an angle, where a positive value of the angle indicates that the aileron is rotated upwards (e.g., in an 'up' position), a negative value of the angle indicates that the aileron is rotated downwards (e.g., in a 'down' position) and a value of 0 indicates that the aileron is in a neutral position.

If, as a result of step 602 it is determined that the aileron is in a down position or a neutral position, in step 604 the Lam aileron on the same wing is driven to its neutral position.

If, however, as a result of step 602 it is determined that the aileron is in an up position (i.e., rotated upwards), the method moves to step 606 where a scaling factor is identified. The scaling factor is a value that can be used to determine an appropriate position of the Lam aileron based upon the detected position of the corresponding aileron. The scaling factor may be a numerical value, for example, that is multiplied by the detected aileron position to determine the Lam aileron position in step 608. For example, if the scaling factor is 2 and the aileron is detected to be rotated upwards by 3.5 degrees, the corresponding position of the Lam aileron may be calculated as 2*3.5 degrees or 7 degrees. A constant scaling factor of 1, therefore, would cause the Lam aileron to be set to the same deflection as the aileron as measured in step 602.

In some embodiments, the scaling factor may be non-constant. For example, the scaling factor may be adjusted based upon the speed of the air craft (or other variables that vary with aircraft speed, such as dynamic pressure). Such a variable scaling factor could allow, for example, more aggressive deployment of the Lam ailerons at low speed, and less aggressive deployment of the Lam ailerons at high speed.

Figure 7A:
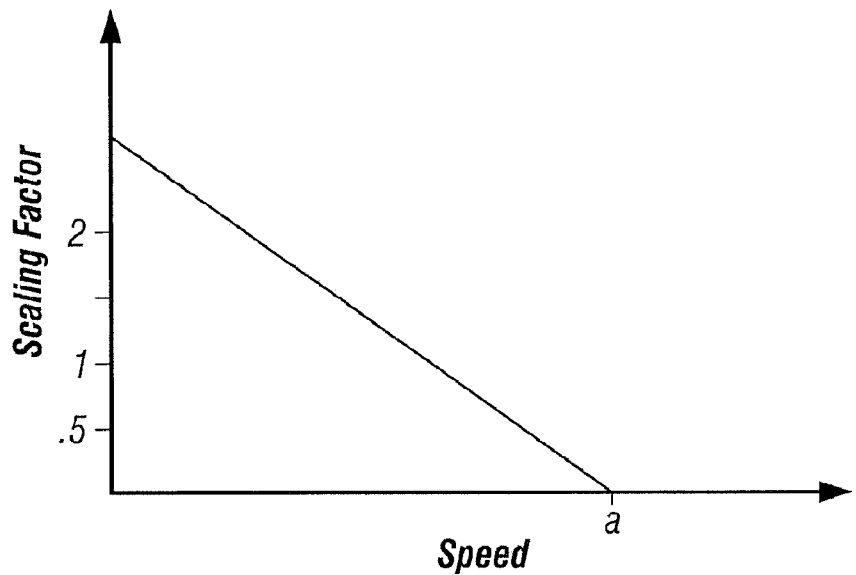
FIGS. 7A and 7B are graphs illustrating scaling factors that may be used in the present flight control system.

To illustrate, FIG. 7A is a graph showing a variable scaling factor. The horizontal axis represents aircraft speed, while the vertical axis represents the scaling factor. As illustrated, at relatively low speed, the scaling factor is higher than at higher aircraft speeds. Above a particular speed threshold (illustrated by point a), the scaling factor is set to 0. With a scaling factor of 0, the Lam ailerons would not be deployed and aircraft roll control would rely solely upon the conventional aileron. In one embodiment, this speed threshold is the aircraft's cruising speed.

Figure 7B:
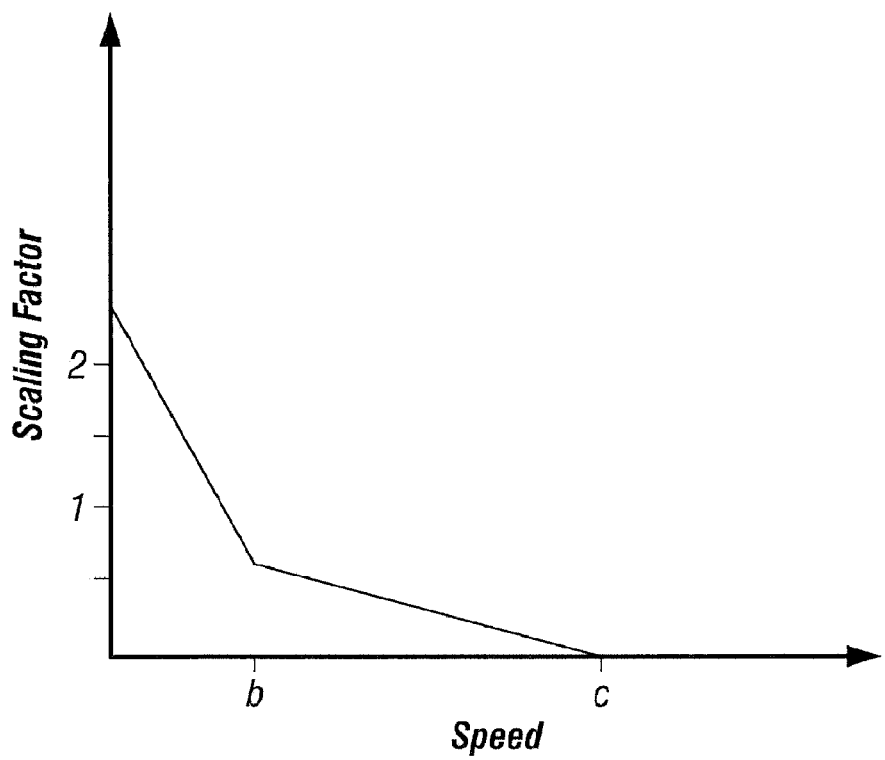

FIG. 7B is a graph showing an alternative variable scaling factor. In FIG. 7B The horizontal axis represents aircraft speed, while the vertical axis represents the scaling factor. As illustrated, below a first speed threshold b (e.g., an approach speed), the scaling factor is quite aggressive, resulting in increased deployment of the Lam aileron. At speeds above the first speed threshold, the scaling factor gradually reduces, until, at a second speed threshold (e.g., cruising speed), the scaling factor is set to 0.

As illustrated, the scaling factors can be fine-tuned to achieve desired aircraft performance characteristics. In some cases, the scaling factor curves can be fine-tuned to achieve a particular aircraft 'feel', perhaps based upon pilot preferences. A more aggressive scaling factor curve may be employed to give an aircraft a 'sportier' feel, whereas a less aggressive scaling factor may make the aircraft feel more stable.

Once the ECU 28 has calculated a desired Lam aileron 6, 7 deflection, the ECU 28 then sends the desired Lam aileron 6, 7 deflection to the servo motors 26 to move the Lam aileron 6 or 7 into position. Thus a feedback loop is created wherein the ECU 28 can automatically and continuously position the Lam ailerons 6 and 7 during flight by monitoring the position of the aircraft's conventional ailerons or an a control input to those ailerons.

The present system also has a backup capability in the event that any portion of the aileron system 20 fails. For example, if the motors 26 or the ECU 28 or even the sensor 29 fails and the system 20 is unable to calculate a proper position or unable to move the ailerons 6 and 7 to the proper position; the pilot can still use the conventional ailerons 10 and 11 to guide and control the plane. The conventional ailerons 10 and 11 operate independently from the aileron system 20 and are not affected by any failure in the aileron system 20. Further, the conventional ailerons 10 and 11 utilize a mechanical linkage structure so they will not be affected by any electronic or computer failure within the airplane. In the event that such a failure is detected (or determined to exist by the pilot) a manual or automatic system may be utilized to drive both Lam ailerons 6 and 7 into their respective neutral positions, thereby having minimal affect on the performance and flight characteristics of the aircraft.

In some cases, if the ECU 28 determines that the aircraft is in a spin, the ECU 28 may be configured to automatically deploy one or both Lam ailerons. By deploying the Lam ailerons, the autorotative drive of the wing that is normally found in conventional ailerons control systems is mitigated, thereby assisting a pilot in exiting the spin. In counter-acting a spin, the Lam ailerons may be deployed in a number of different ways. One approach is to set both Lam ailerons to their fully deployed positions. At the same time the flaps underlying the Lam ailerons may also be fully deployed so as to form air brakes on both wings. In other implementations, an aircraft control system may deploy the Lam ailerons and associated flaps in different manners so as to control a spin. For example, only one Lam aileron may be deflected to counteract the spin, or the Lam ailerons on each wing may be deployed by different degrees. Similarly, the flaps underlying each Lam aileron may be deployed in various different combinations (both deployed 100%, only one flap deployed, or each flap being deployed by different amounts). During a spin, the deployment of the Lam ailerons and, optionally, the underlying flaps may be implemented automatically by a flight control systems (e.g., ECU) or manually, such as by the pilot.

In some embodiments, the ECU 28 may be configured to schedule deployments of the Lam ailerons so as to obviate the need for wing twist or wing cuffs to achieve desired low speed handling characteristics and performance. Additionally, the Lam aileron scheduling may be configured to minimize the danger of high-speed wind gust. In that case, the ECU 28 may be configured to detect the wind gust and then, in response to making that detection, deploy the Lam ailerons to minimize wing lift and protect the aircraft.

Figure 3C:
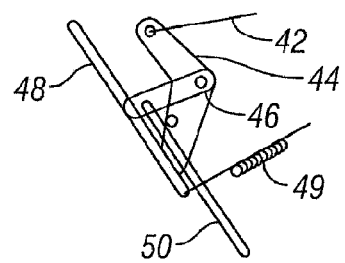
FIG. 3C shows detail of a mechanical linkage utilized to deploy a flap panel.

FIG. 3A also schematically depicts an example of an operating system to implement control of the conventional ailerons 10 and 11. A cable or tubing linkage 32 is connected between a control stick 34 and a bell crank arrangement 36 coupled to a push rod linkage 38 to actuate the conventional aileron 10. As shown in FIGS. 3A and 3C, the auxiliary flap panel 8 can be actuated by a cockpit lever 40 connected by another cable or tube linkage 42. In one implementation, linkage 42 is connected to transfer bell cranks 44 and 46 (shown in schematic form in FIG. 3C), which in turn actuate linkage 50, which is connected to auxiliary flap 8) to move the auxiliary flap 8 up or down on command from the pilot. The push rod 48 can be biased by a spring 49. Other mechanisms may perform the same functions by transducing the pilot's actions through any means of control input, such as conventional stick or yoke movement, or pressure sensing device, with physical implementation by any electrical, mechanical, hydraulic or other motive force.

Cable or tubing-based control systems comprise very simple control systems commonly found on small, light aircraft. They are by no means the only systems capable of performing the functions described, and are chosen only as examples. The controls can be actuated by any means capable of transducing a pilot's actions, including but not limited to conventional stick or control yoke and rudder, flight directors or other automated or computerized pilots, fly-by-wire or even voice command or neural impulse. Control actuation may be implemented via cables, tubings, pushrods, or electric servo motors, electromagnetic actuators, hydraulic cylinders, pneumatic systems, or any method of transferring force to cause mechanical movement of the aileron and flaps.

Figure 5:
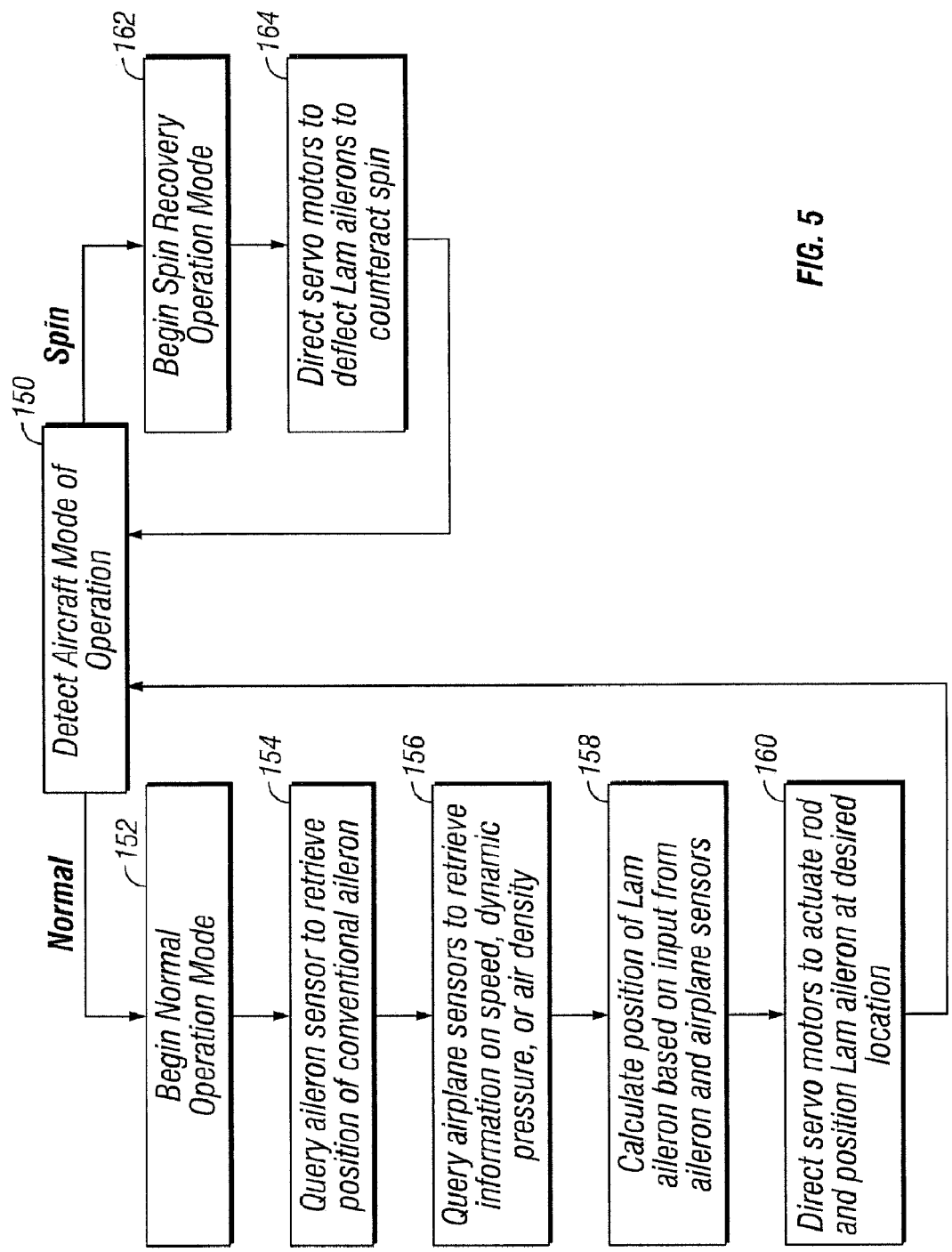
FIG. 5 is a flowchart illustrating an example method for controlling Lam aileron panels of a wing.

FIG. 5 is a flowchart illustrating an example method for controlling Lam aileron panels of a wing. The method may be implemented, for example, by ECU 28 described above. In step 150 the ECU determines the aircraft's current mode of operation. If normal, in step 152 the ECU enters a normal operation mode. In step 154, the ECU query queries a sensor to determine a current position of the aircraft's conventional ailerons and in step 156 the ECU gathers additional information regarding the aircraft's current operating conditions (e.g., speed, dynamic pressure, and/or air density). In step 158, using the information gathered in steps 154 and 156, the ECU determines a desired deployment for the aircraft's Lam ailerons. In step 160, the Lam ailerons are deployed or positioned according to the determination made in step 160. After positioning the Lam ailerons, the method returns to step 150.

If, however, in step 150 the ECU determines that the aircraft is currently in a spin, in step 162 the ECU enters a spin control mode. Accordingly, in step 164, the ECU determines an appropriate deployment for the aircraft's Lam ailerons (as well as other control surfaces) and deploys those control surfaces in an attempt to mitigate the spin.

FIGS. 4A-4G are cross sectional views of a wing depicting a number of different configurations of the Lam aileron panel and flap panel of the present disclosure. The cross-sections of each of FIGS. 4A-4G are taken through the wing so as to show a cross-sectional view of the wing's Lam aileron and underlying flap structure. In each depicted wing, the Lam aileron panel 6 is mounted to the wing in a position over the corresponding flap 8. As discussed above, the position of the Lam aileron panel 6 may be determined by a position of a corresponding conventional aileron panel or by one or more control inputs into the aircraft.

In FIG. 4A, both panels 6 and 8 are shown in their respective neutral or retracted positions, in which the panels form smooth continuations of the respective upper and lower surfaces of the wing W.

FIG. 4B depicts the wing in which both Lam aileron panel 6 and flap panel 8 are deflected upwardly to form an aerodynamically efficient "aileron" in the usual sense. In this implementation, flap 8 is configured to both rotate downwards and/or extend away from the wing (so as to provide a conventional flap function), as well as rotate upwards in conjunction with Lam aileron 6.

With the auxiliary flap panel 8 deployed downwardly, as shown in FIG. 4C, the aileron panel 6 can remain in the neutral position or be deflected up only, while the flap 8 is deflected downwardly so as to increase the wing's lift.

In some wing implementations, rather than separately hinge flap panel 8 and Lam aileron panel 6, both panels may be hinged to rotate about a common axis, as shown in FIG. 4D. In this configuration as well, the aileron panel 6 can be deflected upwardly (FIGS. 4E and 4G), but may not be deflected downwardly beyond its neutral position (FIG. 4F), whereas the auxiliary flap panel 8 can be deflected upwardly in unison with the aileron panel 6 and downwardly independent of the aileron panel 6.

For high performance aircraft, particularly heavy commercial or military aircraft, the number of possible configurations of the ailerons and flaps may be very large. Such complex configurations and deployment schedules might be best managed by pilot control commands implemented through a computer.

The present aileron system can be employed to deploy simultaneously on both wings for flight path control. No rolling motion is caused by symmetrical deployment. The equal deployment results in an equal decrement of lift on both wings and a descending flight path with small changes in pitch attitude and power settings. This effect, as all others with the invention, can be modulated continuously in contrast to that of many conventional air or speed brakes. In this mode, control of the individual ailerons provides roll control.

Accordingly, in one embodiment, an aerodynamic control system for roll control of an aircraft around a longitudinal axis of the aircraft includes a wing having a rear portion, the wing having a top surface and a bottom surface, a first aileron pivotally attached to the top surface of the wing at the rear portion, the first aileron being configured to rotate upwards from a first aileron neutral position and downwards from the first aileron neutral position, and a second aileron pivotally attached to the top surface of the wing at the rear portion, the second aileron being configured to rotate upwards from a second aileron neutral position, but not being able to rotate downwards from the second aileron neutral position. The aerodynamic control system includes a motor connected to the second aileron and configured to rotate the second aileron, a sensor configured to detect a deflection of the first aileron and a controller coupled to the sensor and configured to receive the detected deflection of the first aileron from the sensor, calculate a target deflection for the second aileron using the deflection of the first aileron, and cause the motor to rotate the Lam aileron to the target deflection.

In another embodiment, an aircraft includes a wing, the wing includes an aileron pivotally connected to a trailing edge of the wing, a Lam aileron pivotally connected to the trailing edge of the wing, and a motor connected to the Lam aileron and configured to rotate the Lam aileron. The aircraft includes a controller configured to detect a deflection of the aileron from a neutral position of the aileron, calculate a target deflection for the Lam aileron using the deflection of the aileron, and cause the motor to rotate the Lam aileron to the target deflection.

In another embodiment, a method for controlling an aerodynamic control system for roll control of an aircraft around a longitudinal axis of the aircraft includes detecting a deflection of a first aileron, the first aileron pivotally attached to a top surface of a wing of the aircraft, the first aileron being configured to rotate upwards from a first aileron neutral position and downwards from the first aileron neutral position, calculating a target deflection for a second aileron using the deflection of the first aileron, the second aileron being pivotally attached to the top surface of the wing at the rear portion, the second aileron panel being configured to rotate upwards from a second aileron neutral position, but not being able to rotate downwards from the second aileron neutral position, and rotating the second aileron to the target deflection.

Although not specifically described herein or illustrated in the drawings, it is understood that all of the elements described above are arranged and supported in an operative fashion to form a complete, operative system. Such complementary structure is known and would be provided by a person skilled in the art. Numerous modifications and variations of the present invention are possible in light of the above disclosure. It is therefore to be understood that within the scope of the invention defined in the appended claims the invention may be practiced otherwise than as specifically described herein.

The invention claimed is:

1. A control system, comprising:
   a sensor configured to measure a deflection angle of a first aileron of a wing of an aircraft, the first aileron being configured to rotate upwards from a first aileron neutral position and downwards from the first aileron neutral position;
   a motor configured to rotate a second aileron of the wing, the second aileron being configured to rotate upwards from a second aileron neutral position and to not rotate downwards from the second aileron neutral position; and
   a controller coupled to the sensor and configured to:
     receive the deflection angle from the sensor,
     determine a target deflection angle for the second aileron using the deflection angle, and
     cause the motor to rotate the second aileron to the target deflection angle.

2. The control system of claim 1, wherein to determine the target deflection angle the controller is configured to set the target deflection angle equal to the deflection angle of the first aileron.

3. The control system of claim 1, wherein to determine the target deflection angle the controller is configured to:
   when the first aileron is deflected upwards from the first aileron neutral position, set the target deflection angle of the second aileron equal to the deflection angle of the first aileron; and
   when the first aileron is deflected downwards from the first aileron neutral position, set the target deflection angle of the second aileron to a second aileron neutral position.

4. The control system of claim 1, wherein to determine the target deflection angle the controller is configured to:
   determine a speed of the aircraft; and
   when the speed of the aircraft is above a predetermined speed threshold, set the target deflection angle of the second aileron to a second aileron neutral position.

5. The control system of claim 1, wherein the controller is configured to determine a dynamic pressure of air surrounding the aircraft, and wherein the target deflection angle of the second aileron is at least partially determined by the dynamic pressure.

6. The control system of claim 1, wherein to determine the target deflection angle the controller is configured to:
   determine an initial target deflection angle for the second aileron using the deflection angle of the first aileron
   determine a speed of the aircraft;
   determine a scaling factor based upon the speed of the aircraft; and
   multiply the initial target deflection angle by the scaling factor to determine the target deflection angle.

7. An aircraft, comprising:
   a wing including a Lam aileron pivotally connected to a trailing edge of the wing;
   a motor connected to the Lam aileron and configured to move the Lam aileron; and
   a controller configured to:
     detect a position of a control surface of the aircraft,
     determine a target position using the position of the control surface of the aircraft, and cause the motor to position the Lam aileron in the target position.

8. The aircraft of claim 7, wherein to determine the target position, the controller is configured to set the target position equal to the position of the control surface.

9. The aircraft of claim 7, wherein to determine the target position, the controller is configured to:
when the control surface is in an up position, set the target position equal to the position of the control surface; and
when the control surface is in a down or neutral position, setting the target position to a neutral position.

10. The aircraft of claim 7, wherein the controller is configured to determine a speed of the aircraft, and wherein the target position is at least partially determined by the speed of the aircraft.

11. The aircraft of claim 7, wherein the control surface is an aileron rotatably coupled to the wing.

12. The aircraft of claim 11, wherein the Lam aileron is coupled to the wing and the Lam aileron is configured to rotate upwards from a neutral position and not to rotate downwards from the neutral position.

13. The aircraft of claim 12, wherein the control surface is connected to the wing and the Lam aileron is inboard of the control surface.

14. The aircraft of claim 7, wherein the controller is configured to determine a dynamic pressure of air surrounding the aircraft, and wherein the target position is at least partially determined by the dynamic pressure.

15. A method, comprising:
determining a deflection angle of a first aileron of a wing of an aircraft;
determining a target deflection angle for a second aileron of the wing using the deflection angle of the first aileron; and
causing the second aileron to rotate to the target deflection angle.

16. The method of claim 15, wherein determining the target deflection angle further comprises setting the target deflection angle equal to the deflection angle of the first aileron.

17. The method of claim 15, wherein determining the target deflection angle further comprises:
when the first aileron is deflected upwards from a first aileron neutral position, setting the target deflection angle equal to the deflection angle of the first aileron; and
when the first aileron is deflected downwards from the first aileron neutral position, setting the target deflection angle of the second aileron to a second aileron neutral position.

18. The method of claim 15, wherein determining the target deflection angle further comprises:
determining a speed of the aircraft; and
when the speed of the aircraft is above a predetermined speed threshold, setting the target deflection angle of the second aileron to a second aileron neutral position.

19. The method of claim 15, further comprising determining a dynamic pressure of air surrounding at least a portion of the aircraft, and wherein the target deflection angle of the second aileron is at least partially determined by the dynamic pressure.

20. The method of claim 15, wherein determining the target deflection angle further comprises:
determining an initial target deflection angle for the second aileron using the deflection angle of the first aileron
determining a speed of the aircraft;
determining a scaling factor based upon the speed of the aircraft; and
multiplying the initial target deflection angle by the scaling factor to determine the target deflection angle.

* * * * *